March 27, 1945.  G. N. KROUSE  2,372,434
TENSION-MEASURING INSTRUMENT
Filed Jan. 19, 1944
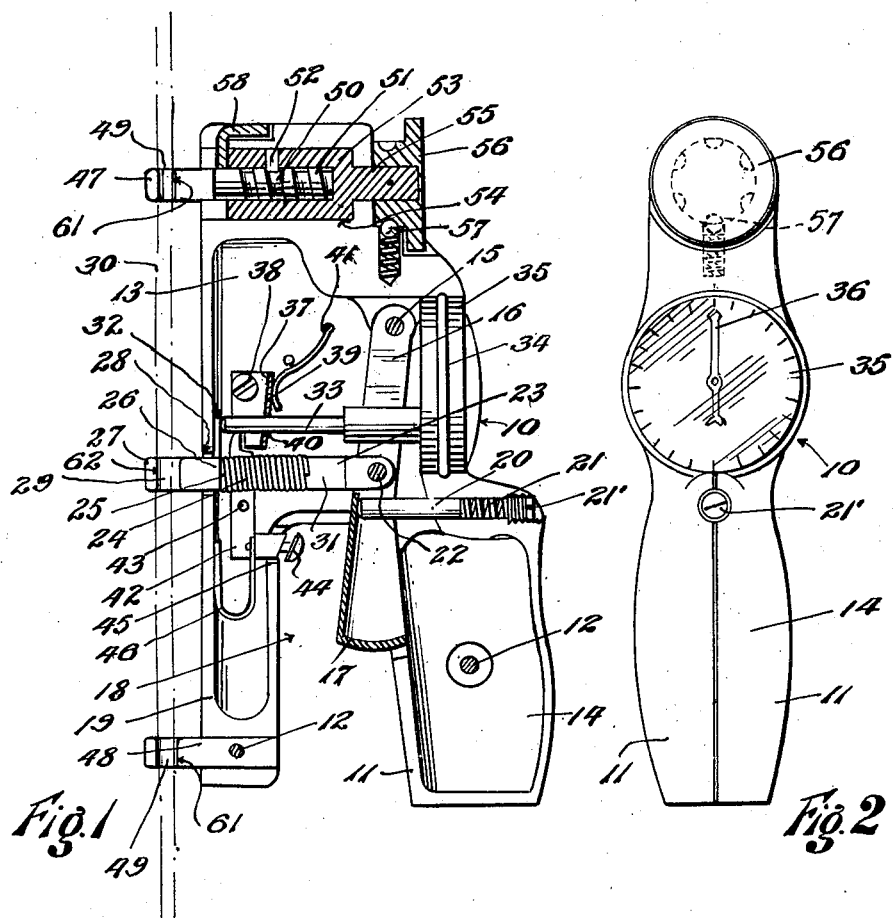
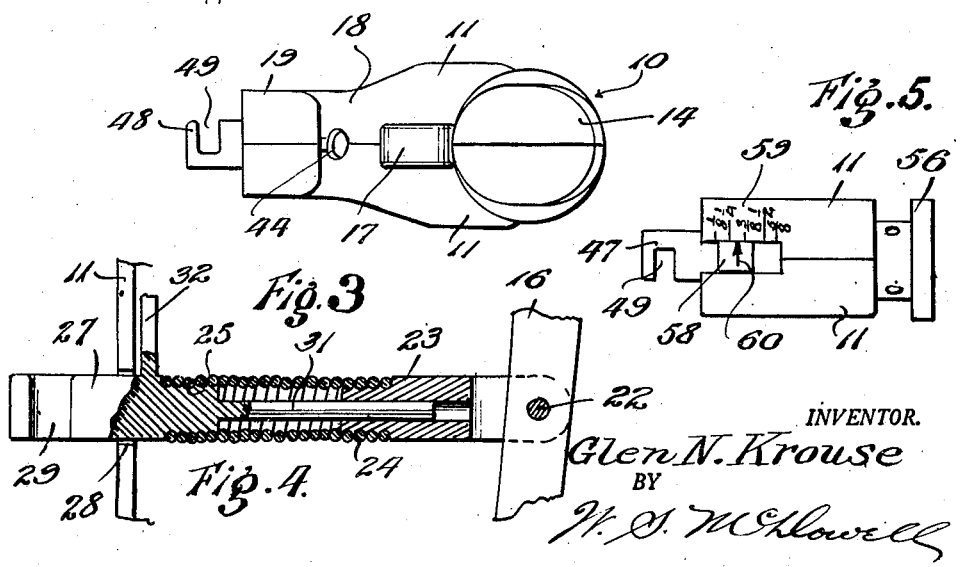
INVENTOR.
Glen N. Krouse
BY Patented Mar. 27, 1945

2,372,434

UNITED STATES PATENT OFFICE 2,372,434

TENSION-MEASURING INSTRUMENT

Glen N. Krouse, Columbus, Ohio

Application January 19, 1944, Serial No. 518,854

3 Claims. (Cl. 73—144)

This invention relates to an improved instrument for measuring or determining tension in taut or stretched wires or cables, and its general object is to provide a portable, readily manipulated instrument formed for convenient application to and removal from stretched cables, the instrument functioning for ascertaining in an accurate, quickly executed and facile manner the tensioning forces existing in the cables tested thereby.

In the manufacture and testing of airplanes particularly, although in certain other capacities, there exists a need for a lightweight, conveniently operated means for determining tension in the wire cables employed in uniting and strengthening various body, control and machine parts. It is important to maintain such cables under a predetermined degree of tension in order that the same may not be subjected to excessive tensioning forces which may result in their accidental parting, or to leave the same under-tensioned and thereby weakening structurally cable-united elements. Accurate and predetermined tensioning of such cables is also necessary in order that when an airplane is being flown, and subjected to widely fluctuating temperatures, the tension of such cables be such as to compensate for variations produced as a result of the differences in expansion and contraction of the materials forming the cable-united parts, all of which being important factors in promoting safety in airplane flight.

Control cables and guy wires used in airplane construction are frequently inaccessibly located, particularly when the same extend through wings or the restricted hull compartments of the fuselage, and, since the cables require testing following their installation, the physical restrictions surrounding the same often make it difficult to employ a tension-indicating instrument. In the prior art, such instruments have been characterized, in the main, by their large, bulky and cumbersome structure which in many cases is such as to preclude the use thereof in the restricted spaces available. Again, prior devices require both hands of the operator to manipulate the same and they are inconvenient to employ in dark places where an artificial light is required to illuminate a registering dial.

Accordingly, it is another object of the present invention to provide a measuring instrument for determining cable tension in which the instrument is of such size that it may be conveniently manipulated by one hand of the operator, and wherein the instrument is provided with a pistol-like grip with which is associated a trigger capable of being actuated by the index finger of the operator, and wherein the back of the instrument is provided with a tension-denoting dial so located as to be presented to the ready view of the operator.

Another object of the invention is to provide an instrument of the character set forth wherein the dial indicator may be positively retained or locked in its final reading position independently of the release of the actuating trigger, so that after the instrument is removed from the cable, the dial may be read with full accuracy, a finger-actuated release being associated with the dial locking device to restore the same to normal operation following the dial reading.

For a further understanding of the invention, reference is to be had to the following description and the accompanying drawing, wherein is illustrated one embodiment of the invention, and in which:

Fig. 1 is a vertical sectional view;

Fig. 2 is a rear elevational view of the instrument;

Fig. 3 is a bottom plan view;

Fig. 4 is a detail vertical sectional view disclosing the spring union between the trigger actuated lever arm and the intermediate cable yoke;

Fig. 5 is a detail plan view of the top portion of the instrument.

The tension indicating instrument, comprising the preferred form of the present invention, is composed of an outer casing 10 formed from two duplicate sections 11—11 usually of cast metal. These casing sections are joined together by transversely extending fastening elements 12, so arranged as to effect and maintain a close junction between the plane meeting surfaces of said sections. The sections are formed to provide an internal chamber 13, in which is situated the movable operating parts, hereinafter described, of the instrument. Also, the sections 11 are formed to provide a pistol-like handle 14, which may be readily gripped in order that the instrument may be supported and manipulated by a single hand of the operator.

Pivotally mounted as at 15 within the chamber 13 is a depending trigger element 16, this element being formed with a finger-engaging extremity 17 arranged at the front of the handle 14, and projecting into a space 18, formed between the handle 14 and a depending forward leg 19 of the casing. The rear surface of the trigger extremity 17 is engaged by the forward end of a sliding pin 20. The rear end of this pin is engaged by a coil spring 21, which is held in the bore provided in the casing for the slidable support of the pin 20 by a removable threaded plug 21'. Through the use of the spring 21 and its associated pin 20, a force is applied to the trigger element to maintain the latter normally in its forward position.

Pivotally connected as at 22 with the trigger element, and disposed within the chamber 13, is a horizontally extending sleeve 23. The forward end of this sleeve is helically grooved and has fastened thereto one end of a coiled load spring 24. The forward end of this spring is engaged with helical grooves 25 provided in a member 26 formed with a forwardly extending cable-engaging yoke 27. This yoke projects slidably through a slot 28 formed in the forward wall of the casing 10 and its outer portion is provided with an open-sided recess or slot 29 adapted for the reception of a cable 30 to be tested. The member 26 at its rear end terminates in a rod extension 31 which is slidably received in the bore of the sleeve 23. The tension characteristics of the spring 24 are such that said spring serves normally to draw the yoke 27 and the trigger element together and to resist separation thereof, as will be clearly understood by reference to Fig. 4.

Within the confines of the chamber 13, the yoke 27 is provided with an upstanding lug 32 which is disposed in engagement with the forward end of a slidable gauge-operating rod 33. This rod extends into the casing 34 of a dial-type indicating gauge 35 of conventional design. Consideration will disclose that when the trigger element is pressed by the index finger of the operator, a yielding pull will be imparted to the intermediate yoke by the action of the coil spring 24, and the resulting inward movement of said yoke is transmitted directly to the rod 33 to cause the rotation of the index hand 36 on the exposed dial face of the gauge, as by the use of a conventional rack and pinion linkage, not shown. This dial face is arranged at the rear of the instrument so that it may be read with facility by the operator. When used in inaccessible locations, it is often necessary to remove the instrument from the cable undergoing testing before the gauge can be read. In order to hold the tension-indicating position of the gauge, even though the trigger element is released, use is made of a latch 37 which is pivotally mounted as at 38 in the chamber 13.

This latch includes a wall 39 in which is formed an opening 40 for the reception of the gauge rod 33, and a spring 41 biases the latch so that the walls of the opening 40 may be held in frictional gripping relationship with the rod 31 to restrain the latter against return movement when the trigger element is released and the lug 32 of the yoke member 27 moves away from the outer end of the rod 31. After the gauge reading has been obtained, the rod may be released by the provision of a trip lever 42. This lever is pivotally mounted as at 43 within the chamber 13 and is formed with an exteriorly projecting extension 44. This extension projects through a slot 45 provided in the leg 19 of the casing so that it is accessible for operational purposes in the space 18, where it may be engaged by the index finger of the operator to rock the latch against the resistance of the U spring 46, and thereby cause the upper end of the trip lever to contact the latch 37. This operation oscillates the latch so that its wall 39 is approximately perpendicular to the axis of the rod 33, thus releasing the gripping action which the latch exerts on the gauge rod, allowing the latter to return into its normal engagement with the lug 32 of the cable yoke 27.

The upper end of the casing carries in spaced relation from the yoke 27 a top yoke 47, which is adjustable longitudinally to compensate for variations in the diameter of the cables undergoing testing. Also the bottom of the casing, at the lower end of the extremity 17 thereof, is provided with a fixed bottom yoke 48. The yokes 47 and 48 are each provided with recesses or slots 49 adapted for registration with the recess or slot 29 provided in the intermediate yoke 27.

The top yoke 47 is provided with a shank 50 provided with coarse screw threads 51, and engaging the grooves of these threads is a pin 52 projecting inwardly and transversely from a sleeve 53. This sleeve is rotatably supported in a socket 54 provided in the upper portion of the casing, and at one end the sleeve 53 terminates in a stud 55 which extends axially and outwardly from the casing socket 54. The outer end of the stud is equipped with an adjusting knob or wheel 56, by means of which the sleeve member 53 may be rotated. At intervals, the hub of the knob or wheel 56 is formed with spaced spherical depressions adapted for the reception of a spring pressed ball 57, which functions to retain the wheel or knob and its associated sleeve in fixed positions of rotatable adjustment.

The yoke 47 carries a projection 58, which is movable with respect to a graduated surface 59 provided at the top of the casing 10, the surface 59 containing symbols designating cable diameters, in order to facilitate the setting of the top yoke in its proper operating position. For example, if the cable undergoing testing should measure one-eighth of an inch in diameter, the knob or wheel 56 is turned until the indexing line 60 on the projection 58 registers with the graduation line of the surface 59 indicating the symbol ⅛, or if the cable should measure one-fourth of an inch in diameter, the projection is adjusted through the rotation of the knob or wheel 56 to bring the line 60 thereof into registration with the graduation indicating ¼, such adjustment being made prior to determining the cable tension.

In the use of the instrument, the upper yoke is first set so that it will occupy an operating position determined by the diameter of the cable undergoing testing. As just explained, such setting of the upper yoke is performed by turning the knob or wheel 56 until the projection 58 registers with the graduation on the surface 59 corresponding with the diameter of the cable to be tested. The instrument is then applied to the cable by positioning the latter in the side slots or recesses formed in the yoke members. In this connection, the cable should engage with the vertical surface 61 of the recess 49 provided in the top yoke 47 and also be in engagement with the corresponding surface of the recess 49 of the bottom yoke 48.

With respect to the intermediate yoke, the cable should engage the surface 62 of the recess or slot 29. When such engagement has been effected, the operator applies finger pressure to the actuating extremity 17 of the trigger element 16. This results in the deflection of the cable between its points of engagement with the top and bottom yokes 47 and 48, since the intermediate yoke 27 is drawn inwardly by the action of the load spring 24. If the cables should be relatively lightly tensioned, the load spring will elongate to but a limited degree until the trigger element comes to a positive stop, thus imparting maximum longitudinal movement to the lug 32. However, as the tensioning forces on the cable increase, deflecting resistance thereof is correspondingly increased, so that greater elongation of the load spring exists with reduced longitudinal movement on the part of the intermediate yoke member in an inward direction.

It will be understood that the trigger element may be retracted to its maximum extent, but that such retraction is not necessarily transmitted to the gauge operating rod 33, since excess movement of the trigger element is absorbed by the elongation of the load spring but inward travel of the lug 32 is limited by the resistance offered to the movement of the intermediate yoke by the tension forces in the cable undergoing testing. Thus the end of the load spring joined with the sleeve 23 of the trigger element moves through a definite amount of travel under trigger action. This variation in the deflection of the cable in response to the action of the trigger element and the load spring is used to actuate the indicating pointer 36. Preferably, the dial 35 indicates cable deflection in .001 inch.

With the instrument there may be used a chart adapted for ready reference by the operator to correlate readings taken from the gauge with the diameter of the cable tested to indicate at a glance the tensioning load on the cable so tested.

In view of the foregoing, it will be seen that the present invention provides a lightweight portable device which may be supported in one hand of an operator and conveniently applied to an associated cable and operated to indicate the tensioning forces applied to the cable. The device may be used with rapidity and used by a person of slight experience in obtaining accurate and reliable readings with respect to cable tension. While light in weight and relatively simple in construction, the device is exceptionally sturdy in its mechanical design and may be used indefinitely without necessitating mechanical repair.

Although I have described in considerable detail one embodiment of my invention, it will be understood that various changes and modifications may be made without departure from the scope of the following claims.

I claim:

1. A portable hand-operated instrument for determining tension in stretched cables, comprising a casing, spaced relatively stationary cable-engaging end yokes carried by said casing, means for adjusting the operating positions of at least one of said end yokes to adapt the same to cables of different diameters, a movable cable-engaging yoke carried by said casing in registration with and disposed midway between said end yokes, a movable manually operated actuating element, yieldable means actuated by the movement of said element for tending to move said movable yoke in a direction to deflect a stretched cable engaged with said yokes laterally between its positions of engagement with the end yokes, and indicating means actuated by the movement of said movable yoke for denoting the extent of deflection of said cable.

2. Apparatus for determining tension in a stretched cable, comprising a casing, a pair of spaced-apart cable-engaging end yokes carried by said casing, manually operated threaded means cooperative with at least one of said end yokes for adjusting its operating positions, a movable cable-engaging yoke carried by said casing midway between said end yokes, a movable manually operated actuating element, a contractile spring uniting said element and movable yoke and operable to move said last-named yoke in a direction to deflect said cable laterally between its positions of engagement with the end yokes, and indicating means actuated by the movement of said movable yoke to denote the extent of lateral deflection of said cable.

3. A portable hand-operated instrument for determining the tension in a stretched cable, comprising a casing having a pistol-like gripping handle and a manually operated trigger element, spaced relatively stationary cable-engaging end yokes carried by said casing, a slidably movable cable-engaging yoke carried by said casing between said end yokes, a contractile spring uniting said trigger element and movable yoke, said spring being operable upon actuation of said trigger element to move said movable yoke inwardly of said casing in a direction to deflect said cable laterally between its positions of engagement with said end yokes, a deflection-indicating gauge having a movable actuating rod, lug means on said movable yoke engaged with said rod to actuate said gauge upon movement of said movable yoke in one direction, and releasable means for latching said rod and retaining said gauge in its deflection-indicating positions independently of return movement of said movable yoke to its normal position.

GLEN N. KROUSE.